(12) United States Patent
DeJonge

(10) Patent No.: US 6,837,474 B1
(45) Date of Patent: Jan. 4, 2005

(54) ELECTRICALLY OPERATED REMOTE TRIP MECHANISM AND METHOD

(75) Inventor: William John DeJonge, Wellsville, NY (US)

(73) Assignee: Dresser-Rand Company, Olean, NY (US)

(*) Notice: Subject to any disclaimer, the term of this patent is extended or adjusted under 35 U.S.C. 154(b) by 0 days.

(21) Appl. No.: 10/664,375

(22) Filed: Sep. 17, 2003

(51) Int. Cl.$^7$ ............................................. F16K 31/44
(52) U.S. Cl. .......................................... 251/68; 251/66
(58) Field of Search .................................... 251/66–74

(56) References Cited

U.S. PATENT DOCUMENTS

| | | | |
|---|---|---|---|
| 4,070,609 A | | 1/1978 | Barrett et al. |
| 4,273,307 A | * | 6/1981 | Malinski et al. ............... 251/69 |
| 4,460,007 A | * | 7/1984 | Pirkle ........................... 137/79 |
| 4,554,788 A | | 11/1985 | Hwang et al. |
| 4,929,148 A | | 5/1990 | Nutter |
| 5,088,341 A | | 2/1992 | Hyde et al. |
| 6,032,921 A | * | 3/2000 | Krepela ..................... 251/63.4 |
| 6,116,258 A | | 9/2000 | Shapiro et al. |
| 6,206,337 B1 | * | 3/2001 | Veillet, Jr. ................... 251/67 |

* cited by examiner

Primary Examiner—Paul J. Hirsch
(74) Attorney, Agent, or Firm—Michael Best & Friedrich LLP

(57) ABSTRACT

A mechanism and method for controlling an external member, such as the shut off valve of a steam turbine, from a remote location according to which latching and tripping devices are connected to the plunger of a solenoid so that the control of the external member is achieved by energization of the solenoid.

12 Claims, 1 Drawing Sheet

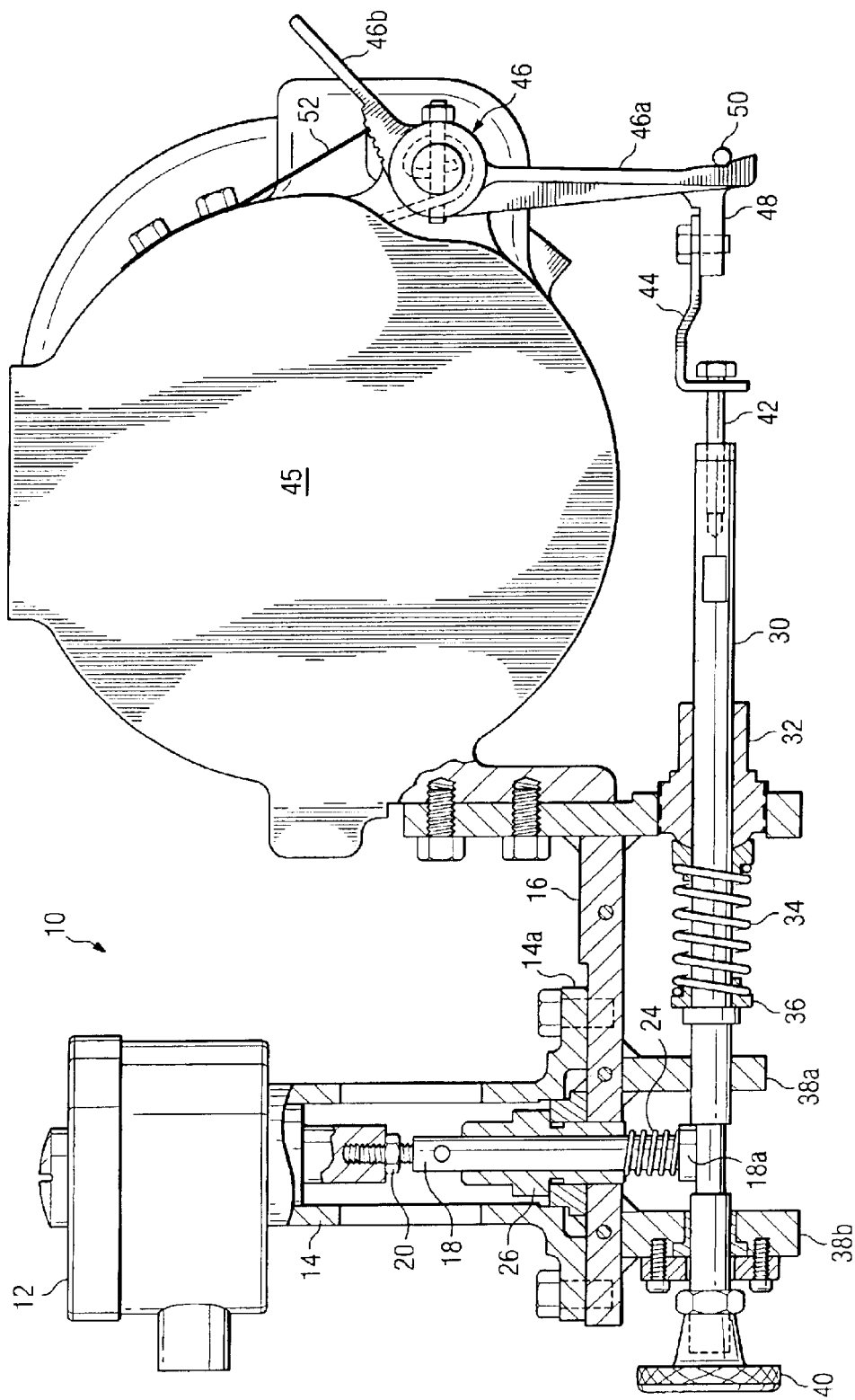

ELECTRICALLY OPERATED REMOTE TRIP MECHANISM AND METHOD

BACKGROUND

This invention relates to a trip mechanism for performing a mechanical function, and, more particularly, to a trip mechanism that is electrically operated and functions to control a device from a remote location, such as shutting down a steam turbine.

It is often difficult to perform certain mechanical functions, especially from a remote location. For example, devices to remotely shut down a steam turbine require pressurized oil or pressurized air in addition to an electrical signal. This, of course, is complicated and expensive.

The present invention improves over these prior techniques by providing a remote trip mechanism that can be actuated electrically without the need for pressurized oil, pressurized air, or the like.

BRIEF DESCRIPTION OF THE DRAWING

The drawing is a sectional view of an embodiment of the present invention.

DETAILED DESCRIPTION

Referring to the drawing, the reference 10 refers, in general, to an electrically operated remote trip mechanism according to an embodiment of the invention. The mechanism includes a solenoid 12 having a plunger 12a that reciprocates in a housing. The plunger 12a is normally fully extended from the housing of the solenoid 12 but moves in an axial direction upwardly towards the housing in response to the application of an electrical signal to the solenoid, which can be done remotely or by switch associated with the solenoid, all in a conventional manner.

The solenoid 12 is supported in one end portion of a hollow cylindrical adapter 14 in any conventional manner such as a threaded engagement. A flange 14a is formed on the other end of the adapter and is bolted to a support bracket 16. The adapter 14 houses a portion of a latch rod 18 that is connected at one end to the plunger 12a by a jam nut 20. The other end portion of the latch rod 18 projects outwardly from the adapter 14.

A spring 24 is supported on a stepped-down portion of that portion of the latch rod 18 extending out from the adapter 14 and the upper end of the spring rests against an adjuster member 26 that extends around the latch rod 18 and through an opening in the support bracket 16. The adjuster member 26 is in threaded engagement with the support bracket 16 so that rotation of the member 26 causes it to move axially and adjust the compression of the spring 24. The other end of the spring 24 rests on a head 18a formed on, or attached to, the latter end of the latch rod 18 so that the spring normally urges the head, and therefore the latch rod, in a downwardly direction, as viewed in the drawing.

A trip rod 30 extends perpendicular to the latch rod 18 and through an adjuster nut 32 supported in a threaded opening in the bracket 16. The adjuster nut 32 is fixed to the trip rod 30 so that rotation of the nut causes it, and the trip rod, to move axially. A spring 34 extends around a portion of the trip rod 30 and between the nut 32 and an annular spring seat 36 also extending around the trip rod and secured thereto. Therefore, the above axial movement of the adjuster nut 32 and the trip rod 30 adjusts the compression of the spring 34. The compressed spring 34 urges the spring seat 36, and therefore the trip rod 30, in a direction from right-to-left, as viewed in the drawing.

The trip rod 30 extends through openings in a guide 38a and a bushing 38b, respectively, that extend from the bracket 16 and are spaced to either side of the latch rod 18. The guide 38a and the bushing 38b support the trip rod 30 in a position in which it is engagable by the head 18a of the latch rod. A reset knob 40 is fixed over the end of the trip rod 30 adjacent the bushing 38b, and an adjustable bolt 42 extends from the other end of the trip rod 30 for receiving one end portion of a latch 44.

An overspeed safety device 45 is mounted to the bracket 16 and is not shown in detail since it forms no part of the present invention.

A trip lever 46 is mounted for rotation on the overspeed safety device 45 and includes two legs 46a and 46b that extend from a hub 46c at an angle to each other. The other end portion of the latch 44 is bolted to a flange 48 that extends from the end portion of the leg 46a. An actuation rod 50 normally extends in a notch formed in the inner surface of the leg 46a but is released from this engagement upon rotation of the trip lever 46 in a manner to be described. A plurality of notches are formed in the leg 46b, one of which is engaged by the end of a retaining member 52 whose other end portion is bolted to the overspeed safety device 45.

The drawing depicts the solenoid 12 in its normal, non-energized state with the spring 24 urging the latch rod 18 in a downwardly direction so that the head 18a extends in the stepped-down portion of the trip rod 30. This locks the trip rod 30 in the position shown and prevents the spring 34 from urging it in a right-to-left direction.

When the solenoid 12 is energized by the application of an electrical signal, the plunger 12a is moved upwardly with sufficient force to overcome the bias of the spring 24. This also moves the latch rod 18 upwardly and releases the head 18a from the trip rod 30, thus allowing the spring 34 to force the trip rod, and therefore the latch 44, in a direction from right-to-left. This, in turn, causes rotation of the trip lever 46 in a direction indicated by the arrow in the drawing and releases the leg 46a from the rod 50.

It is understood that this release of the rod 50 in the above manner permits it to perform work such as controlling an external member. For example, the external member could be the mechanical shut off valve of a steam turbine or the like, and the rod could be connected, either directly or by linkage, or the like (not shown), to the valve so that when the rod 50 is released, the valve is shut off.

After a predetermined, relatively short period of time, the solenoid 12 is deenergized, the plunger 12a released, and the spring 24 once again urges the latch rod 18 in a downward direction. The reset knob 40 can then be manually pushed in a direction from left-to-right as viewed in the drawing, to cause it and the trip rod 30 to move until the stepped-down portion of the trip rod aligns with the head 18a of the latch rod 18 and thus permits the head to move downwardly under the action of the spring 24 and reenter the stepped-down portion of the trip rod. This movement of the trip rod 30, and therefore the latch 44, rotates the trip lever 46 back to the position shown in the drawing causing the corresponding end of the retaining member 52 to engage a notch in the leg 46b of the trip lever 46 to lock it against any further rotation. The rod 50 could then be manually engaged into the notch in the leg 46a of the trip lever 46 and thus retained in this position until the next cycle. If the rod 50 is used to close the shut off valve of a steam turbine as discussed in the example above, this would permit the valve to move to an open position.

It is understood that variations may be made in the foregoing without departing from the scope of the invention. For example, although only a single bracket (16) has been referred to above, it is understood that several different brackets could be provided. Also, it is understood that the rotation of the trip lever 46 in the above manner can cause other mechanical movement that would control other functions of associated equipment, in a similar manner. Further, although the drawing depicts the latch rod 18 extending vertically and the trip rod 30 extending horizontally, it is understood that this orientation is for the purpose of example only and does not limit the orientation of the above components. Therefore, spatial references, such as "upward", "downward", "vertical", etc., are for the purpose of illustration only and also do not limit the specific orientation or location of the structure described above.

Although only a few exemplary embodiments of this invention have been described in detail above, those skilled in the art will readily appreciate that many other modifications are possible in these embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A mechanism comprising:

a solenoid having a plunger adapted for movement in response to a signal, a latch rod connected to the plunger for movement therewith;

a trip rod; and means for urging the trip rod in a direction so that the latch rod engages the trip rod in a manner to prevent the movement of the trip rod in the direction, so that energization of the solenoid causes movement of the plunger, and therefore the latch rod, to release the engagement with the trip rod and permit the trip rod to move in the direction.

2. The mechanism of claim 1 further comprising a lever adapted to rotate in response to the movement of the trip rod.

3. The mechanism of claim 2 wherein the lever has a leg that is engaged by an actuation rod, so that movement of the trip rod causes corresponding rotation of the lever and release of the actuation rod to permit the actuation rod to control an external member.

4. The mechanism of claim 3 wherein the actuation rod extends in a notch in the leg of the lever.

5. The mechanism of claim 3 wherein the external member is a shut off valve and wherein release of the actuation rod permits it to close the shut off valve.

6. The mechanism of claim 1 wherein the trip rod has a stepped-down portion that receives an end of the latch rod.

7. The mechanism of claim 6 wherein the latch rod has an enlarged head on the end of the latch rod that extends in the stepped-down portion of the trip rod.

8. The mechanism of claim 1 further comprising means for moving the latch rod in a direction opposite the direction of movement of the plunger so that the mechanism can be reset.

9. The mechanism of claim 8 wherein the mechanism is reset by manually moving the trip rod in a direction opposite the direction so that the latch rod can engage the trip rod.

10. A method of shutting off a steam turbine from a remote location, the method comprising;

connecting a trip rod to a shut off valve of the turbine;

urging the trip rod for movement in a direction so that it closes the shut off valve;

urging a latch rod into engagement of the trip rod to prevent the movement of the trip rod;

connecting a latch rod to the plunger of a solenoid; and energizing the solenoid so that movement of the plunger causes the latch rod to move out of engagement with the trip rod so that the trip rod moves in the direction to close the shut off valve.

11. The method of claim 10 further comprising resetting the trip rod by manually moving it in a direction opposite the direction of movement of the trip rod so that the latch rod can engage the trip rod.

12. The method of claim 10 further comprising urging the latch rod in a direction opposite the direction of movement of the plunger so that the latch rod can engage the trip rod.

* * * * *